United States Patent [19]

MacDonald

[11] 3,730,292

[45] May 1, 1973

[54] SOUND SUPPRESSION SYSTEM
[75] Inventor: Howard R. MacDonald, San Diego, Calif.
[73] Assignee: Rohr Corporation, Chula Vista, Calif.
[22] Filed: Jan. 22, 1971
[21] Appl. No.: 108,918

[52] U.S. Cl. .......................... 181/33 HC, 239/265.11
[51] Int. Cl. ................................................ B64d 33/06
[58] Field of Search ...................... 181/33 H, 33 HA, 181/33 HB, 33 HC, 33 HD, 43, 51; 239/127.3, 265.11, 265.13, 265.17, 265.19

[56] References Cited

UNITED STATES PATENTS

| | | | |
|---|---|---|---|
| 3,053,340 | 9/1962 | Kutney | 181/33 HC |
| 3,174,581 | 3/1965 | Duthiou et al. | 181/33 HC |
| 3,286,787 | 11/1966 | Wirt | 181/50 X |
| 3,443,757 | 5/1969 | Townend | 181/33 HC |
| 2,396,068 | 3/1946 | Youngash | 181/33 HC |
| 3,113,428 | 12/1963 | Colley et al. | 181/33 HC |
| 3,436,020 | 4/1969 | Duthion et al. | 239/265.13 |
| 3,481,427 | 12/1969 | Dobbs et al. | 181/33 HB |
| 3,508,838 | 4/1970 | Martenson | 181/33 HA |
| 3,570,769 | 3/1971 | Freeman | 239/265.13 |

FOREIGN PATENTS OR APPLICATIONS

| | | | |
|---|---|---|---|
| 670,930 | 4/1952 | Great Britain | 181/33 HC |

Primary Examiner—Richard B. Wilkinson
Assistant Examiner—John F. Gonzales
Attorney—George E. Pearson

[57] ABSTRACT

System includes a nozzle located aft of the tail pipe and connected thereto to define a discharge zone and surround and direct the flow of the gaseous stream. Nozzle is corrugated fore and aft to define peripherally spaced lobes to divide the gaseous stream and flow passage valleys between the lobes for free stream air. Concave valleys converge rearwardly and terminate outward of engine axis. A center body is located coaxially with engine and with its forward portion extending forward into the aft portion of the nozzle. The dome-shaped nose faces directly into the axial flow of the central portion of the gaseous stream and has sound absorbing surface to absorb sound waves in the gaseous stream. All or part of inner walls of lobes may be similarly treated to increase sound absorption. Location of nose is such that sound waves reflected by nose and lobes will strike opposing surfaces to further increase sound absorption. With or without sound absorbing surfaces, nose and following portion of center body may be tailored to cooperate with lobes to define convergent nozzle profile or convergent-divergent nozzle profile without requiring surfaces of double curvature in lobes.

8 Claims, 3 Drawing Figures

Patented May 1, 1973

3,730,292

INVENTOR.
HOWARD R. MACDONALD

BY

George E. Pearson
ATTORNEY

SOUND SUPPRESSION SYSTEM

BACKGROUND OF THE INVENTION

This invention lies in the field of sound suppression of gas turbine or jet engines, which produce reaction thrust by ejecting a high velocity stream of gas from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system in which free stream air is mixed with the exhaust gas to cool it and to raise the sound frequencies to levels which are more readily attenuated in passing through the atmosphere. It is directed particularly to a system of the type which uses a corrugated or "daisy" nozzle having a plurality of peripherally spaced lobes serving as discrete discharge passages for the propulsion gases, the free stream air flowing through the valleys between the lobes to meet the propulsion gases along the extensive boundary line and mix with them. While these devices reduce the initial sound level to an appreciable extent, the remaining sound power is still undesirably high.

SUMMARY OF THE INVENTION

The present invention provides a very noticeable improvement in the sound suppression function with a minimum of equipment and with no moving parts requiring repair and maintenance. Generally stated, the system includes a nozzle of the type mentioned above, which is attached to the tail pipe and forms a continuation thereof to define a discharge zone and to surround and direct the flow of the gaseous propulsion stream. The forward end of the nozzle is preferably circular for attachment to the tail pipe and the balance is formed with gradually deepening axially directed corrugations defining a plurality of peripherally spaced lobes which constitute rearwardly directed discharge passages for the gaseous stream. The spaced lobes define between them rearwardly converging flow path concave valleys for free stream air to enter and mix with the gaseous flow at the fluted exit margin of the nozzle. As stated above, this produces a significant attenuation of the engine noise.

The additional noise attenuation provided by this invention results in part from inserting the forward end of a coaxial center body within the aft portion of the nozzle between the inner edges of the aft portions of the lobes and valleys. The nose of the center body is dome-shaped and provided with a sound absorbing surface. Since the nose faces directly into the central portion of the axially flowing gaseous stream, it intercepts the intense turbine and compressor noise and absorbs a substantial part of it. Sound absorption is augmented by the provision of sound absorbing surfaces on all or part of the inner walls of the lobes. Because of the geometry of the combination, a large portion of the sound waves reflected by the various surfaces will strike opposing surfaces, and further sound absorption is accomplished.

In addition to sound suppression, the combination presents other advantages of considerable value. The dome-shaped nose may be tailored to cooperate with the lobes to define a convergent nozzle profile without requiring any surfaces of double curvature in the lobes. The dome may readily be drawn to desired shape while the multiple lobes may be made with simple bending at a very considerable cost saving. The following portion of the center body may be formed as a rearwardly converging cone. If this portion starts within the nozzle, it serves to define a convergent-divergent nozzle profile. If an intermediate, generally cylindrical section follows the nose within the nozzle, it may be tailored to define a nozzle profile corresponding substantially with that of a standard conical A.S.M.E. nozzle.

BRIEF DESCRIPTION OF THE DRAWINGS

Various other advantages and features of novelty will become apparent as the description proceeds in conjunction with the accompanying drawing, in which.

DESCRIPTION OF PREFERRED EMBODIMENTS

Figure 1:
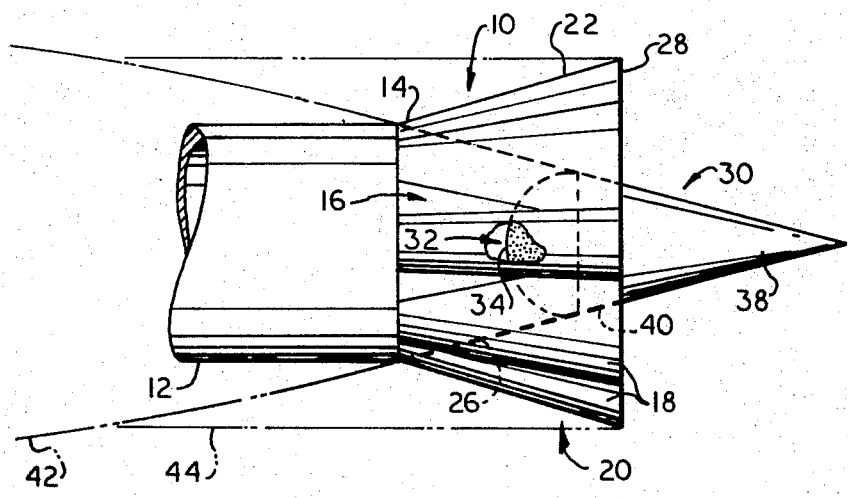
FIG. 1 is a schematic side elevational view of a tail pipe and nozzle incorporating the invention.
Figure 2:
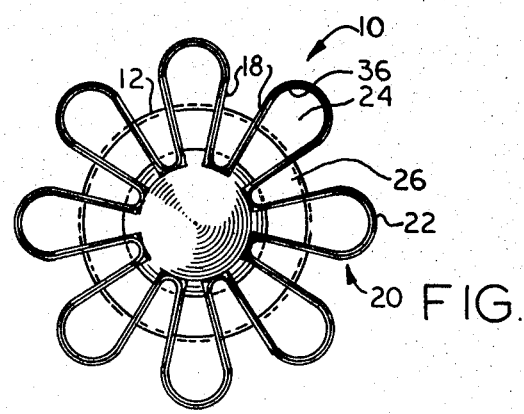
FIG. 2 is a schematic end elevational view looking forward at the assembly of FIG. 1.

The general arrangement of the invention is illustrated in FIGS. 1 and 2, in which a nozzle 10 is shown as attached to the aft end of tail pipe 12 of the engine, not shown. The forward end 14 of the nozzle is generally circular to conform to the cross section of the tail pipe and is attached thereto by any suitable means to form a virtual continuation of the tail pipe. The nozzle defines a discharge zone 16 to surround and direct the flow of the gaseous stream.

Starting adjacent to the forward end 14, the balance of the nozzle is formed with a gradually increasing outside diameter and with gradually deepening corrugations 18 extending axially to produce a plurality of peripherally spaced and radially extending lobes 20 having crests 22. These lobes are open at their aft ends to constitute discrete rearwardly directed discharge passages 24 for the gaseous stream. They also define between them an equal number of flow passage valleys 26 for free stream air, which passages converge rearwardly and are of maximum depth at the fluted exit margin 28 of the nozzle, where they are radially spaced from the engine axis. The free stream air converging through valleys 26 meets the gaseous stream discharged from the lobes at the exit margin 28. The greatly extended fluted marginal boundary line increases the area of contact to produce maximum mixing and significant noise attenuation.

To substantially increase the total noise attenuation, the assembly is provided with a center body 30 located coaxially of the engine and with its forward portion extending into the aft portion of the nozzle. The center body is provided with a dome-shaped nose 32 having a sound absorbing surface 34. There are various types of surfaces available but it is presently preferred to employ a metallic skin with a multiplicity of apertures mounted on a porous base or core, which may be metallic honeycomb. In effect, the dome is formed as a honeycomb sandwich with the convex face perforated. This gives practically the best strength-weight ratio available.

The greatest intensity of high frequency noise generated by the compressor and turbine is in the central portion of the gaseous stream which flows axially with very high velocity and is intercepted by nose 32 which absorbs a substantial portion of the noise while directing the flow outwardly around the center body and into the lobes. To further increase the attenuation, all or a part of the inner walls of the lobes may be formed with sound absorbing surfaces 36 of the same type as used on the nose, and the lobes will therefore absorb another large portion of the sound waves in the gaseous stream. In addition, because of the geometry of the assembly, it will be apparent that many of the sound waves reflected by the nose will strike the lobes and be absorbed, and vice versa. Since the center body completely plugs the hole which would otherwise exist in the center of the lobed nozzle, it produces maximum exposure of the gaseous stream to the sound absorbing surfaces, resulting in maximum noise attenuation.

The provision of the center body as disclosed provides other advantages apart from and in addition to the noise attenuation features. Its dome-shape gradually decreases the flow area in the direction of the nozzle exit. Thus the forward portion of the nozzle may be of greater area with less drag, and the nose combines with the lobes to define a convergent nozzle. The size, shape, and location of the nose may be selected to produce any desired nozzle profile. An advantage is that only one dome is needed for one nozzle and it may be readily shaped with double curvature by a drawing process. The multiple lobes may then be shaped by only simple bending so that all of their fore and aft sections are straight lines. The great cost reduction in manufacture will be readily apparent.

The following portion of the center body may take a variety of shapes. As shown in FIG. 1, section 38 is rearwardly convergent to form a cone with the forward portion 40 extending into the aft portion of the nozzle. This construction combines with the nose and lobes to define a convergent-divergent nozzle profile within the nozzle itself and a divergent slope aft of the nozzle exit. Thus it serves as an extremely simple means to provide such a nozzle. Preferably the angle of the cone is substantially the same as the angle of the valleys so that the free air stream may flow to the axis and attain maximum mixing with the propulsion stream. Since the inner aft edges of the lobes and their valleys overlie the forward portion of the cone, they may be fixedly secured together to provide rigid support for the lobe structure.

The contour of the nacelle is indicated in FIG. 1 by broken lines 42. The maximum diameter of the nozzle is indicated by broken lines 44. It will be seen that the maximum diameter of the nozzle is substantially less than the maximum diameter of the nacelle. It is preferably about 75 percent. Consequently, the nozzle is entirely within the wake of the nacelle, resulting in minimum drag.

Figure 3:
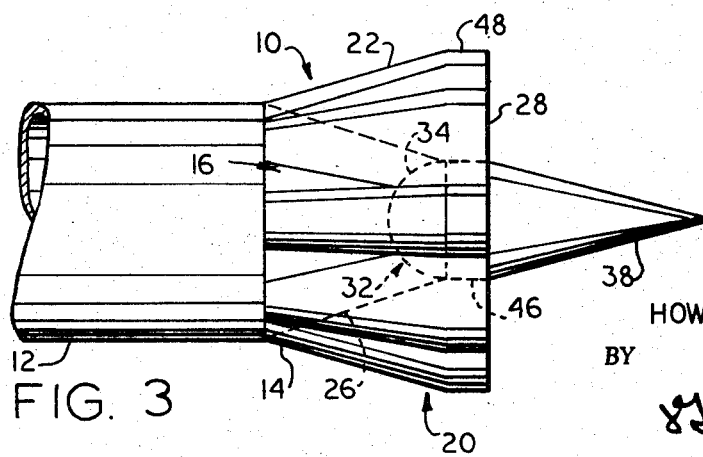
FIG. 3 is a view similar to FIG. 1, showing a modification.

The assembly of FIG. 3 is generally the same as that of FIG. 1, including the sound absorbing surfaces of the nose and the lobes. However, in FIG. 3 an intermediate section 46 is provided immediately aft of nose 32 extending to the exit margin 28. This section is generally cylindrical and, together with the nose and lobes, combines to define a nozzle profile corresponding substantially to that of the well known standard conical A.S.M.E. nozzle. If a closer approach is desired, the aft ends of the lobes may be flattened as indicated at 48. Cone 38 is secured to the aft end of section 46 and may have substantially the same slope as valleys 26. As in the first form, the center body is fixedly secured to the lobes for rigidity.

It will be apparent that the invention disclosed herein provides a simple system, with no moving parts, which produces a very high level of noise attenuation. It further provides a system for achieving any desired type of nozzle profile with a minimum of high cost manufacturing operations.

Having thus described the invention, what is claimed as new and useful and is desired to be secured by U.S. Letters Patent is:

1. A sound suppression system for use in combination with a jet engine having a rearwardly discharging tail pipe, comprising:

a nozzle located aft of the tail pipe and connected thereto to define a discharge zone and to surround and direct the flow of the gaseous stream; the nozzle being corrugated fore and aft to define a plurality of peripherally spaced, divergent and radially extending lobes; each lobe constituting a rearwardly directed discharge passage for a portion of the gaseous stream; each pair of adjacent lobes defining between them a concave flow passage valley for free stream air converging rearwardly toward the engine axis and terminating radially outward of the axis; the fluted exit margin of the nozzle providing an elongated junction line for mixing of the free stream air with the gaseous stream; and a center body located coaxially with the engine and having a forward portion extending forward into the aft portion of the nozzle between the valleys in contact therewith and having a rearwardly convergent cone portion extending aft of the nozzle exit; the center body having a dome-shaped nose facing directly into the axial flow of the central portion of the gaseous stream, said nose being constructed of sound absorbing metallic honeycomb sandwich panel structure having a perforated gas stream exposed face to absorb a substantial portion of the sound waves in the gaseous stream.

2. A system as claimed in claim 1; the inner walls of the lobes also being constructed of sound absorbing metallic honeycomb sandwich panel structure having perforated gas stream exposed faces; the relative shape and arrangement of the nose and the lobes being such that sound waves reflected from some of said perforated faces strike other of said sound absorbing structures to increase the total amount of sound absorption.

3. A system as claimed in claim 2; the inner edges of the aft portions of the lobes being fixedly connected to the center body to rigidify the assembly and to produce maximum exposure of the gaseous stream to the sound absorbing faces.

4. A system as claimed in claim 1; the size, shape, and location of the center body nose being selected to cooperate with the lobes in defining a convergent nozzle profile.

5. A system as claimed in claim 4; the intermediate portion of the center body aft of the nose and forward of the nozzle exit being rearwardly convergent to define a convergent-divergent nozzle profile.

6. A system as claimed in claim 4; the center body cone portion aft of the nose being rearwardly convergent to form a cone extending aft of the nozzle exit and cooperating with the nose and the lobes to define a convergent-divergent nozzle profile within the nozzle and a continuing divergent nozzle slope aft of the nozzle exit.

7. A system as claimed in claim 1; the aft cone portion of the center body being formed as a rearwardly convergent cone with substantially the same angle of convergence as the angle of convergence of the valleys.

8. A system as claimed in claim 7; the forward end of the cone being sized and located to form a substantially direct continuation of the converging valleys.

* * * * *